No. 847,103. PATENTED MAR. 12, 1907.
M. N. OTTO.
FILTERING APPARATUS.
APPLICATION FILED MAY 29, 1906.
2 SHEETS—SHEET 1.
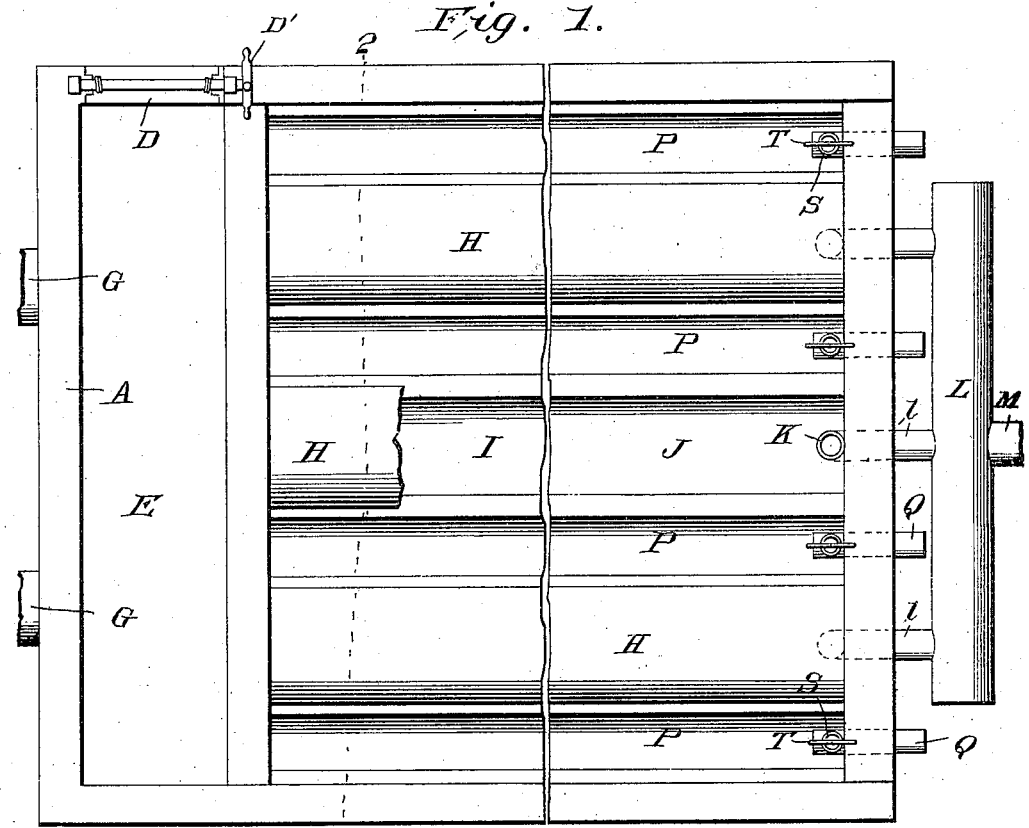
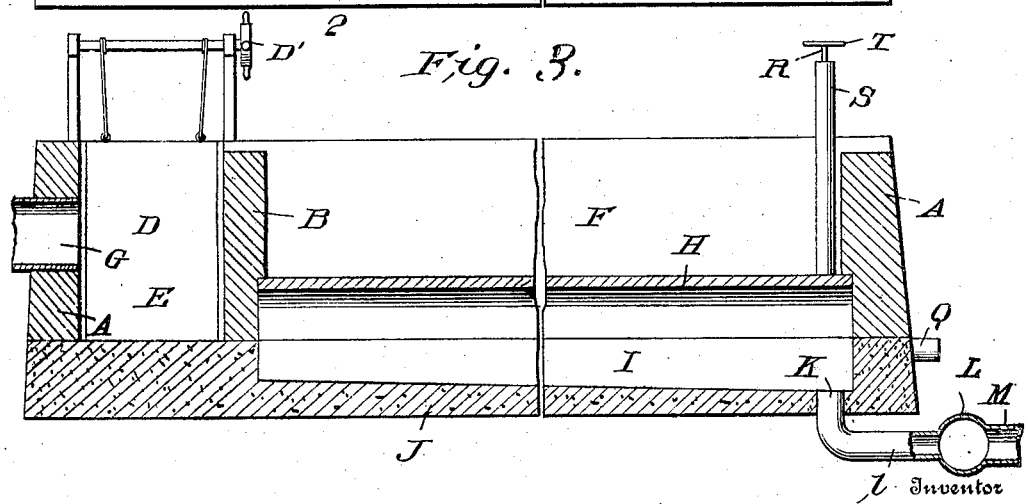

No. 847,103. PATENTED MAR. 12, 1907.
M. N. OTTO.
FILTERING APPARATUS.
APPLICATION FILED MAY 29, 1906.

2 SHEETS—SHEET 2.

Witnesses
Thos. W. Riley
James E. Babcock

Inventor
Matthias N. Otto

By Wm. H. Babcock
Attorney

THE NORRIS PETERS CO., WASHINGTON, D. C.

UNITED STATES PATENT OFFICE.

MATHIAS N. OTTO, OF LANCASTER, PENNSYLVANIA.

FILTERING APPARATUS.

No. 847,103.  Specification of Letters Patent.  Patented March 12, 1907.

Application filed May 29, 1906. Serial No. 319,238.

*To all whom it may concern:*

Be it known that I, MATHIAS N. OTTO, a citizen of the United States of America, residing at Lancaster, in the county of Lancaster and State of Pennsylvania, have invented certain new and useful Improvements in Filtering Apparatus; and I do hereby declare the following to be a full, clear, and exact description of the invention, such as will enable others skilled in the art to which it appertains to make and use the same.

This invention relates to filtering apparatus having a continuous flow of water through arches of porous material and adapted to yield either a large or a small supply as needed.

The said invention consists in the construction and combination of parts hereinafter more particularly set forth and claimed.

Figure 2:
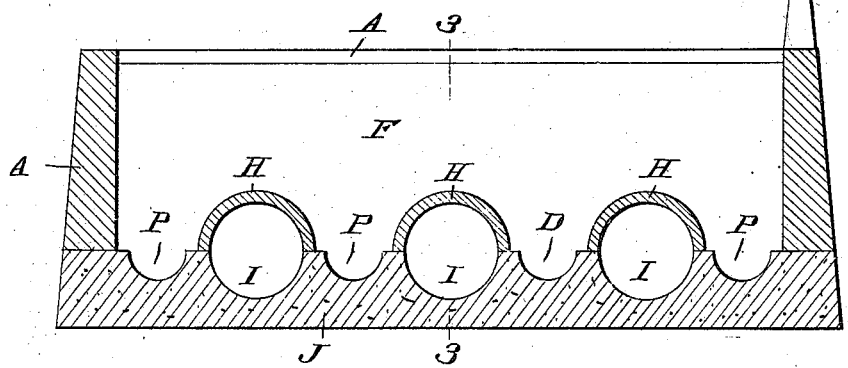
Figure 4:
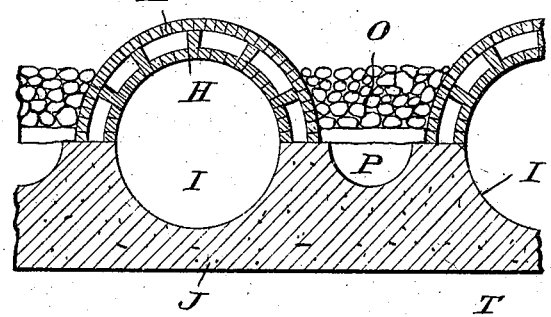
Figure 6:
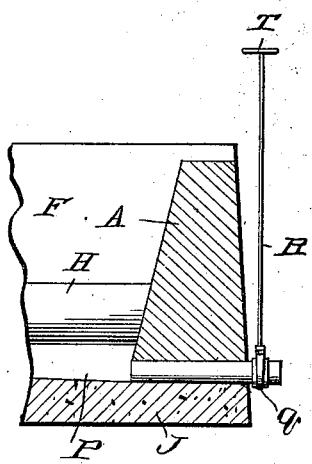
Figure 5:
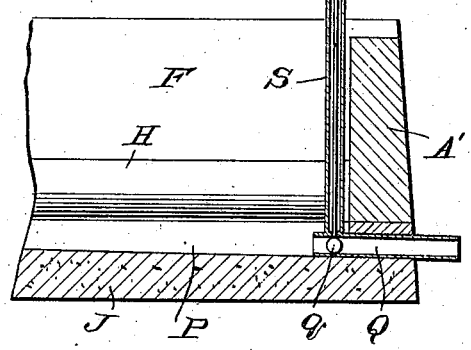

In the accompanying drawings, Figure 1 represents a plan view of filtering apparatus embodying my invention with one of the filtering-arches removed. Fig. 2 represents a vertical cross-section of the same on the line 2 2 of Fig. 1, the arches all being in place. Fig. 3 represents a vertical longitudinal section of the same on the line 3 3 of Fig. 2; and Figs. 4, 5, and 6 represent detail views.

A designates the exterior wall of a filtering inclosure or basin provided near the inlet end with a lower partition B, which separates a water-inlet space or channel from the main chamber F of the filter. The water enters this space by a door D or inlet-pipes G, or both, and on rising above the level of the top of partition B it naturally flows over into main chamber F, without escaping from the apparatus over the taller proximate parts of outer wall A.

The filtering is done by arches H, of porous brick or other suitable porous filtering material. Said arches may be of any preferred number or size in cross-section, according to the required supply. For small arches a single layer of such brick is used, but for large arches a double layer H', with spaces and alternating supports between, will be preferred, as shown in Fig. 4. These arches run longitudinally of the inclosure or filtering-basin in parallel lines approximately from end to end of the main chamber. Each of them covers a channel I in a concrete bed J, forming therewith a tube circular in cross-section, and both the channel and the arch slope downward to facilitate the outflow of the water. This passes down through short horizontal pipes *l* and L and at last to and through the main outlet-pipe M. The spaces between the arches are filled with broken stone O, and under the layers of said stone are longitudinal cleaning troughs or grooves P, formed in said bed of concrete. The bottoms of said grooves are in a higher horizontal plane than those of channels J, and their width is less than that of said channels. They alternate with said channels, run parallel to them, and incline like them from the inlet end of the apparatus down to the outlet end. Cleaning-tubes Q, provided with outlet-valves *q*, extend from the outlet ends of these troughs P through the front wall A' of the inclosure, which is thicker and lower than the remainder of the exterior wall A, though slightly higher than partition B. These valves are opened and closed at will from above the apparatus by rods R, extending vertically upward through protecting-tubes S and provided at the upper end with handles T for convenience in turning them. These protecting-tubes S are mounted on the said tubes Q.

The operation is as follows: The water flows continuously into space E over partition D and into main chamber F, where it rises high enough to cover the filtering-arches H. It then filters down through said arches into the channels I, passes along the latter to their lower ends, and escapes through pipes K and branch outlet-pipes *l* L to the main outlet-pipe M. When the filter requires cleaning, the valves *q* are opened by turning the rods R, and the greater part of the water then rushes out through the tubes Q, cleaning the arches and also the intervening broken stone in its passage. The stone may be removed from time to time to complete the cleaning. If the inflow of water should exceed the capacity of pipes K and the opening of the cleaning-valves should be neglected, the overflow will be only at the outlet end of the basin or inclosure by reason of the less height of end wall A' as compared with the remainder of the exterior wall A.

Of course the aforesaid devices may be used for filtering any liquid; but they are obviously best adapted to water, it being used in so much greater quantities and with so much stronger current than any other.

Having thus described my invention, what I claim as new, and desire to secure by Letters Patent, is—

1. In filtering apparatus a bed provided in its upper face with a series of horizontal channels having outwardly and downwardly inclined bottoms, in combination with a series of horizontal porous semicylindrical arches supported on said base and covering said channels substantially as set forth.

2. In filtering apparatus, a basin or inclosure provided with an inlet-space at one end and means for supplying the same, also with a partition which is lower than the proximate parts of the outer wall, in combination with a series of arches of filtering material in the main chamber divided by said partition from said inlet-space, channels covered by said arches and outlets from said channels substantially as set forth.

3. In filtering apparatus, a series of filtering-arches and channels covered thereby, in combination with alternating cleaning troughs, independent outlets from said channels and from said troughs, means for supplying water to said arches and cleaning-troughs and valves controlling at will the outflow from the latter substantially a set forth.

4. In filtering apparatus, a basin having the outlet end of its exterior wall lower than the rest of said wall and also provided near its inlet end with a partition which is lower than the latter, in combination with means for supplying water to the space between said partition and the proximate end of said basin, means for filtering the water as it passes from the main chamber of the basin on the other side of said partition, inclined troughs in the floor of said basin, separate from said filtering means, outlets from said troughs through the exterior wall of said basin and valves operated at will for opening and closing these outlets to clean the said main chamber substantially as set forth.

In testimony whereof I have signed my name to this specification in the presence of two subscribing witnesses.

MATHIAS N. OTTO

Witnesses:
I. C. ARNOLD,
ANTHONY GEPE.